US012694644B2

(12) United States Patent
Kong et al.

(10) Patent No.: US 12,694,644 B2
(45) Date of Patent: Jul. 28, 2026

(54) RE-IDENTIFICATION SYSTEM

(71) Applicant: TOYOTA JIDOSHA KABUSHIKI KAISHA, Aichi-ken (JP)

(72) Inventors: Quan Kong, Tokyo-to (JP); Hsuan-Kung Yang, Tokyo-to (JP); Norimasa Kobori, Tokyo-to (JP); Jira Jindalertudomdee, Tokyo-to (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 254 days.

(21) Appl. No.: 18/608,944

(22) Filed: Mar. 19, 2024

(65) Prior Publication Data

US 2024/0386697 A1      Nov. 21, 2024

(30) Foreign Application Priority Data

May 19, 2023    (JP) .................................. 2023-083290

(51) Int. Cl.
*G06V 10/74*            (2022.01)

(52) U.S. Cl.
CPC .................................. *G06V 10/761* (2022.01)

(58) Field of Classification Search
CPC ...... G06V 10/761; G06V 20/52; G06V 40/23; G06V 40/25; G06V 40/167; G06V 10/62; G06T 2207/30232; G06T 2210/12; G06T 7/292
USPC ........................................................ 382/219
See application file for complete search history.

(56) References Cited

U.S. PATENT DOCUMENTS

| | | | |
|---|---|---|---|
| 2016/0012280 A1 | 1/2016 | Ito et al. | |
| 2017/0039419 A1 | 2/2017 | Shiiyama et al. | |
| 2023/0117398 A1 * | 4/2023 | Son ........................ | G06V 20/53 |
| | | | 382/103 |
| 2024/0153106 A1 * | 5/2024 | Sasatani ................. | G06V 20/70 |

FOREIGN PATENT DOCUMENTS

| | | | | |
|---|---|---|---|---|
| CN | 111046752 A | * | 4/2020 | ............. G06F 18/22 |
| JP | 2011-100175 A | | 5/2011 | |
| JP | 2017-033547 A | | 2/2017 | |
| JP | 2017-097549 A | | 6/2017 | |
| KR | 20210133562 A | * | 11/2021 | ............. G06T 7/292 |
| WO | 2014/132841 A1 | | 9/2014 | |

* cited by examiner

*Primary Examiner* — Chineyere Wills-Burns
*Assistant Examiner* — Emmanuel Silva-Avina
(74) *Attorney, Agent, or Firm* — HAUPTMAN HAM, LLP

(57) ABSTRACT

A re-identification system temporarily performs a re-identification process for determining whether two moving objects shown in a plurality of videos are identical or not. Similarities between the two moving objects in the re-identification process are ranked in consideration of a direction of each moving object. The rank is highest when the two moving objects are identical and the two moving objects are same in the direction. The rank is lowest when the two moving objects are not identical and the two moving objects are different in the direction. A ranking rule is that the rank is higher as the similarity is higher. The re-identification system calculates a degree of consistency between the ranking result and the ranking rule. Then, the re-identification system finally determines whether the two moving objects are identical or not based on the degree of consistency in addition to the similarities.

4 Claims, 6 Drawing Sheets

SIMILARITY CALCULATION PROCESS

250-A

<TR-A> t=ta1: [FEA-A[ta1], DIR2]
t=ta2: [FEA-A[ta2], DIR2]
t=ta3: [FEA-A[ta3], DIR1]
. . .
t=tax: [FEA-A[tax], DIR4]

250-B

<TR-B> t=tb1: [FEA-B[tb1], DIR3]
t=tb2: [FEA-B[tb2], DIR3]
t=tb3: [FEA-B[tb3], DIR2]
. . .
t=tby: [FEA-B[tby], DIR1]

$SIM_j$
$(j=1{\sim}x{*}y)$

FIRST SCORE CALCULATION PROCESS

SAME IN DIRECTION : $SCR_j = \lambda 1 \times SIM_j$
DIFFERENT IN DIRECTION : $SCR_j = \lambda 2 \times SIM_j$
$(\lambda 1 > \lambda 2)$

RE-IDENTIFICATION SYSTEM

CROSS-REFERENCES TO RELATED APPLICATION

The present disclosure claims priority to Japanese Patent Application No. 2023-083290, filed on May 19, 2023, the contents of which application are incorporated herein by reference in their entirety.

TECHNICAL FIELD

The present disclosure relates to a technique for performing re-identification of a moving object.

BACKGROUND ART

Person re-identification is a technique for identifying an identical person from a plurality of videos. A person is detected from images constituting a video, a feature amount of the entire detected person is extracted, and the person re-identification is performed based on the extracted feature amount. The extraction of the feature amount is performed based on a person re-identification model based on machine learning.

As technologies related to extraction of a feature amount of a person and identification of the identical person, for example, technologies disclosed in Patent Literatures 1 to 4 are known.

LIST OF RELATED ART

Patent Literature 1: Japanese Laid-Open Patent Application No. JP-2011-100175
Patent Literature 2: International Publication No. WO2014/132841
Patent Literature 3: Japanese Laid-Open Patent Application No. JP-2017-097549
Patent Literature 4: Japanese Laid-Open Patent Application No. JP-2017-033547

SUMMARY

Re-identification of a moving object (e.g., a person, a robot, or a vehicle) will be considered. An identical moving object shown in a plurality of videos may be different in its "direction." For example, the direction of the identical moving object may differ between a plurality of videos taken by a plurality of cameras having different viewpoints. When the direction of the identical moving object is greatly different between the plurality of videos, accuracy of the re-identification process may be reduced. In order to solve such a problem only by learning of the re-identification model, a great deal of labor will be required.

An object of the present disclosure is to provide a technique capable of improving accuracy of re-identification of a moving object.

An aspect of the present disclosure relates to a re-identification system for re-identification of a moving object.

The re-identification system includes:
one or more processors; and
one or more memories configured to store feature information indicating a combination of a re-identification feature amount and a direction of a moving object in a video.

Types of a rank regarding a similarity between two moving objects include:
a highest rank in a case where the two moving objects are identical and the two moving objects are same in the direction;
a lowest rank in a case where the two moving objects are not identical and the two moving objects are different in the direction; and
an intermediate rank between the highest rank and the lowest rank.

A ranking rule is that the rank is higher as the similarity is higher.

The one or more processors are configured to:
calculate a plurality of similarities between a first moving object and a second moving object based on a plurality of combinations of the re-identification feature amount of the first moving object and the re-identification feature amount of the second moving object;
perform a first determination process that temporarily determines whether the first moving object and the second moving object are identical or not based on each of the plurality of similarities;
determine a plurality of ranks for the plurality of similarities based on a result of the first determination process, the direction of the first moving object, and the direction of the second moving object;
compare a correspondence relationship between the plurality of similarities and the plurality of ranks with the ranking rule to calculate a degree of consistency between the correspondence relationship and the ranking rule; and
perform a second determination process that determines whether the first moving object and the second moving object are identical or not based on the degree of consistency and the plurality of similarities.

According to the present disclosure, the re-identification process is performed in consideration of the direction of the moving object. More specifically, the similarities in the re-identification process are ranked in consideration of the direction of the moving object. Further, the degree of consistency between the ranking result and the ranking rule is calculated. Then, the re-identification process is performed in consideration of the degree of consistency. In this manner, the re-identification process is performed in consideration of the direction of the moving object, and thus the accuracy of the re-identification process is improved.

DETAILED DESCRIPTION

Embodiments of the present disclosure will be described with reference to the accompanying drawings.

1. Overview of Re-Identification System

Re-identification of a moving object is a technique for identifying an identical moving object from a plurality of videos. Examples of the moving object include a person (pedestrian), a robot, a vehicle, and the like. In the following description, a case where the moving object is a person (Person Re-identification) will be considered as an example. When generalizing, "person" in the following description shall be replaced with "moving object." In the following description, the re-identification may be referred to as "ReID."

Figure 1:
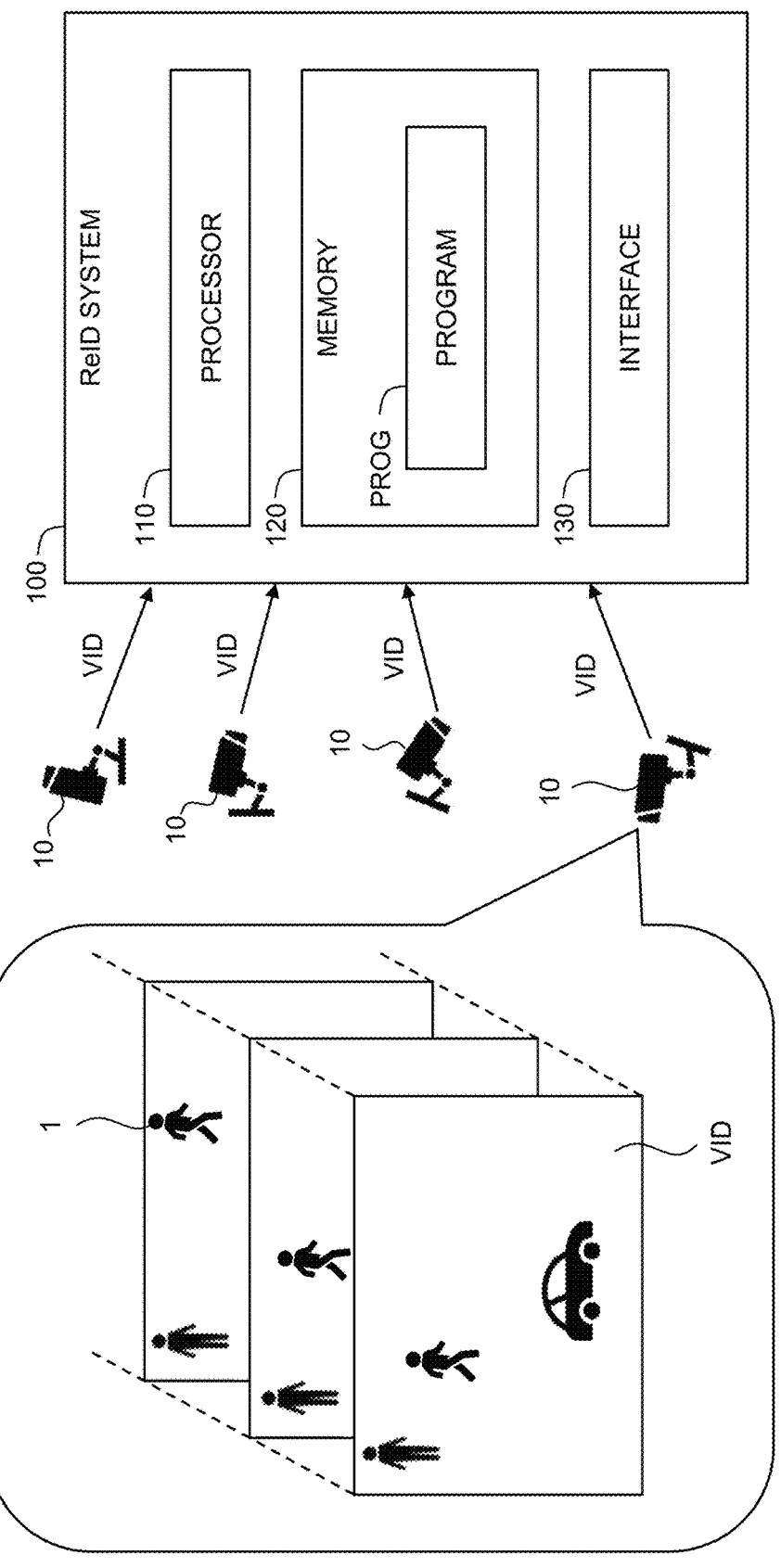
FIG. 1 is a conceptual diagram for explaining an overview of a ReID system according to an embodiment.

FIG. 1 is a conceptual diagram for explaining an overview of a ReID system 100 according to the present embodiment. The ReID system 100 performs re-identification of a person 1. More specifically, the ReID system 100 acquires videos VID taken by one or more cameras 10 installed in a predetermined area. The ReID system 100 identifies an identical person from among a plurality of videos VID. For example, the ReID system 100 identifies an identical person 1 from among a plurality of videos VID taken by different cameras 10. As another example, the ReID system 100 identifies an identical person 1 from among a plurality of videos VID taken by the same camera 10 at different timings. Such the re-identification process makes it possible to track the identical person 1, for example.

The ReID system 100 may be configured by a single node or may be configured by a plurality of nodes. More specifically, the ReID system 100 includes one or more processors 110 (hereinafter simply referred to as a "processor 110" or "processing circuitry"), one or more memories 120 (hereinafter simply referred to as a "memory 120"), and an interface 130. The processor 110 executes a variety processing. For example, the processor 110 includes a central processing unit (CPU). The memory 120 stores a variety of information necessary for the processing. Examples of the memory 120 include a volatile memory, a non-volatile memory, a hard disk drive (HDD), a solid state drive (SSD), and the like. The interface 130 receives a variety of data from the outside and outputs a variety of data to the outside.

The processor 110 acquires a plurality of videos VID via the interface 130. The plurality of videos VID are taken by one or more cameras 10 installed in a predetermined area. The processor 110 performs a re-identification process based on the plurality of videos VID. Then, the processor 110 outputs a result of the re-identification process via the interface 130.

A program PROG is a computer program for performing the re-identification process. The program PROG is stored in the memory 120. The program PROG may be recorded on a non-transitory computer-readable recording medium. The processing by the ReID system 100 (the processor 110) may be implemented by a cooperation of the processor 110 executing the program PROG and the memory 120.

An identical person 1 shown in the plurality of videos VID may be different in its "direction." For example, the direction of the identical person 1 may differ between a plurality of videos VID taken by a plurality of cameras 10 having different viewpoints. When the direction of the identical person 1 is greatly different between the plurality of videos VID, accuracy of the re-identification process may be reduced.

In view of the above, the ReID system 100 according to the present embodiment is configured to be able to perform the re-identification process with high accuracy in consideration of the "direction" of the person 1. Hereinafter, the processing by the ReID system 100 (the processor 110) according to the present embodiment will be described in more detail.

2. Feature Information Acquisition Process

Figure 2:
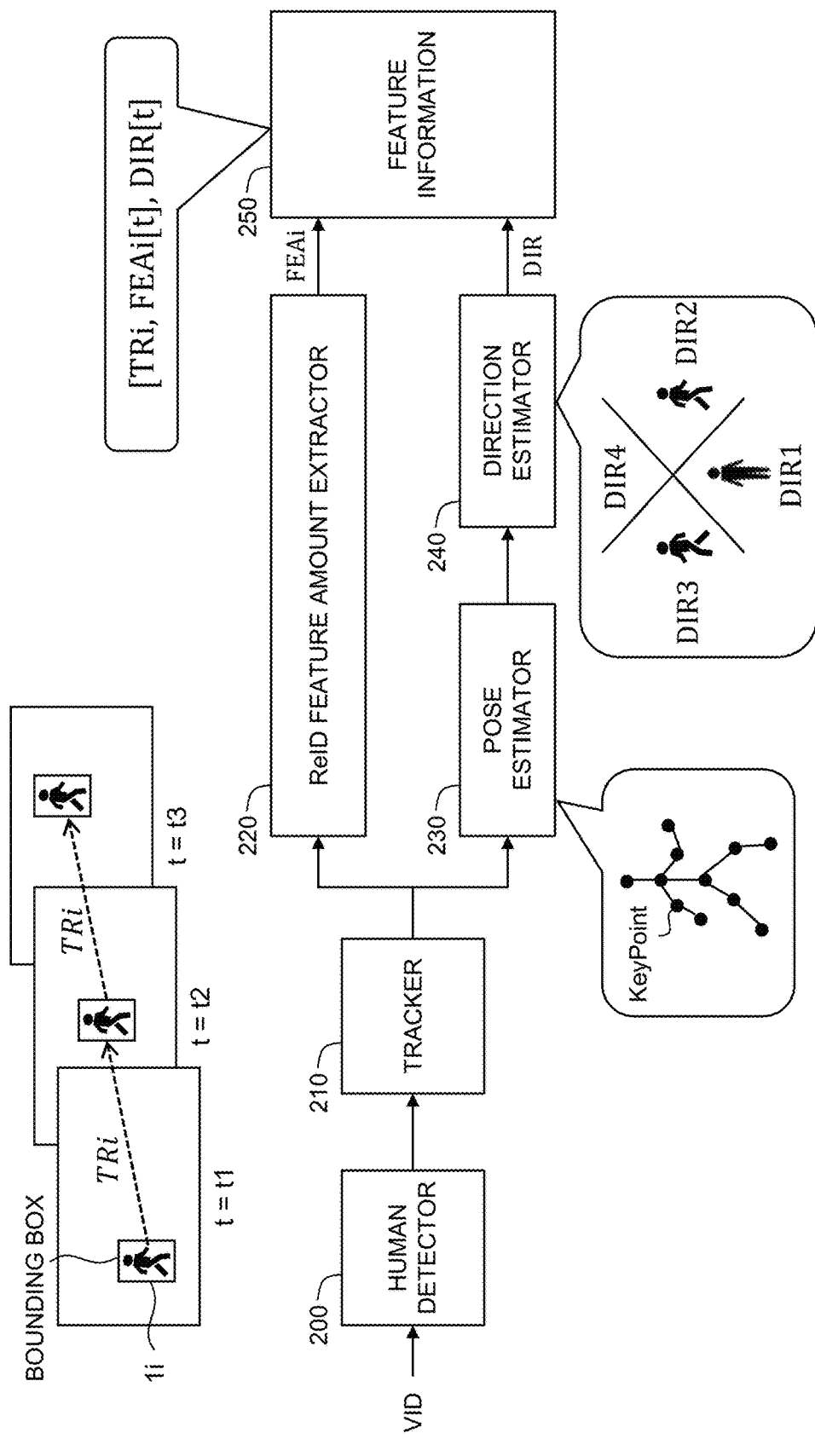
FIG. 2 is a block diagram showing an example of a functional configuration related to a feature information acquisition process according to an embodiment.

FIG. 2 is a block diagram showing an example of a functional configuration related to a feature information acquisition process performed by the ReID system 100 (the processor 110) according to the present embodiment. The ReID system 100 includes, as functional blocks, a human detector 200, a tracker 210, a ReID feature amount extractor 220, a pose estimator 230, and a direction estimator 240.

The video VID is input to the human detector 200. The video VID includes a sequence of images (frames). The human detector 200 performs a person detection process for detecting a person 1 in each image. A bounding box represents a position of the person 1 detected in the image. The human detector 200 acquires information of the bounding box of the person 1 in each image. It should be noted that the person detection process is a well-known technique, and the method thereof is not particularly limited. For example, YOLOX is used as the human detector 200.

The tracker 210 automatically tracks an identical person $1i$ in the sequence of images based on a tracking algorithm. More specifically, the tracker 210 tracks the identical person $1i$ in the sequence of images by tracking the bounding box representing the identical person $1i$ in the sequence of images. The tracker 210 associates multiple bounding boxes representing the identical person $1i$ at multiple time steps (t1, t2, t3 . . . ) with each other. A "track TRi" is a set of the multiple bounding boxes representing the identical person $1i$ at the multiple time steps (t1, t2, t3 . . . ). In other words, the track TRi is information representing a time series of the identical person $1i$ in the sequence of images. It should be noted that the subscript i is identification information of the track TRi, and is not identification information indicating who the person $1i$ is. The tracking process is a well-known technique, and the method thereof is not particularly limited. For example, ByteTrack is used as the tracker 210.

The ReID feature amount extractor 220 extracts a feature amount of the person $1i$ used for the re-identification process, based on an image of a portion of the person $1i$. The feature amount of the person $1i$ used for the re-identification process is hereinafter referred to as a ReID feature amount FEAi[t]. More specifically, the ReID feature amount extractor 220 acquires partial images respectively surrounded by the multiple bounding boxes of the multiple time steps (t1, t2, t3 . . . ) constituting the track TRi. The partial image corresponds to an image of the person $1i$. Then, the ReID feature amount extractor 220 extracts the ReID feature amount FEAi[t] from each partial image by using an ReID model based on the machine learning. In this manner, the ReID feature amount extractor 220 extracts the respective ReID feature amounts FEAi[t] of the person $1i$ at the multiple time steps (t1, t2, t3 . . . ) based on the track TRi. It should be noted that the ReID feature extraction processing is a well-known technique, and the method thereof is not particularly limited. The ReID model may be a model based on Transformer.

The pose estimator 230 estimates a pose of the person $1i$ based on the image of the portion of the person $1i$. More specifically, the pose estimator 230 acquires the partial images respectively surrounded by the multiple bounding boxes of the multiple time steps (t1, t2, t3 . . . ) constituting the track TRi. The partial image corresponds to the image of the person $1i$. Then, the pose estimator 230 extracts key points from each partial image by using a pose estimation model based on the machine learning, and estimates the pose of the person 1i. In this manner, the pose estimator 230 estimates the respective poses of the person 1i in the multiple time steps (t1, t2, t3 . . . ) based on the track TRi. It should be noted that the pose estimation process is a well-known technique, and the method thereof is not particularly limited. For example, TransPose is used as the pose estimator 230.

The direction estimator 240 estimates an apparent direction DIR[t] of the person 1i in the image based on the pose of the person 1i. More specifically, the direction estimator 240 determines, based on the pose of the person 1i, which of a plurality of directions DIR1 to DIRn the direction DIR[t] of the person 1i at each time step (t1, t2, t3 . . . ) is. Here, n is an integer of 2 or more. For example, in a case of n=4, the direction DIR[t] of the person 1i in the image is classified into any of DIR1 (front direction; −45 degrees to +45 degrees), DIR2 (right direction; +45 degrees to +135 degrees), DIR3 (left direction; −45 degrees to −135 degrees), and DIR4 (rear direction; +135 degrees to +180 degrees, −135 degrees to −180 degrees). It should be noted that n is not limited to 4. In this manner, the direction estimator 240 estimates the respective directions DIR[t] of the person 1i at the multiple time steps (t1, t2, t3 . . . ).

Feature information 250 is information indicating a combination of the ReID feature amount FEAi[t] and the direction DIR[t] of the person 1i in the video VID. In the above-described example, the feature information 250 indicates the combination of the ReID feature amount FEAi[t] and the direction DIR[t] for each track TRi. In other words, the feature information 250 indicates a correspondence relationship between the track TRi, the ReID feature amount FEAi[t], and the direction DIR[t]. The feature information 250 is stored in the memory 120. A variety of feature information 250 for a variety of tracks TRi of a variety of videos VID may be generated as a ReID database and updated. Such the ReID database is also stored in the memory 120.

According to the present embodiment, the feature information 250 indicating the combination of the ReID feature amount FEAi[t] and the direction DIR[t] is used for the re-identification process. The re-identification process using the feature information 250 will be described in detail below.

3. Re-Identification Process

Hereinafter, the re-identification process that determines whether a first person 1-A shown in a first video VID-A and a second person 1-B shown in a second video VID-B are identical or not will be considered. A first track TR-A is the track TR related to the first person 1-A shown in the first video VID-A. A second track TR-B is the track TR related to the second person 1-B shown in the second video VID-B. First feature information 250-A is the feature information 250 related to the first person 1-A obtained based on the first track TR-A. Second feature information 250-B is the feature information 250 related to the second person 1-B obtained based on the second track TR-B.

Figure 3:
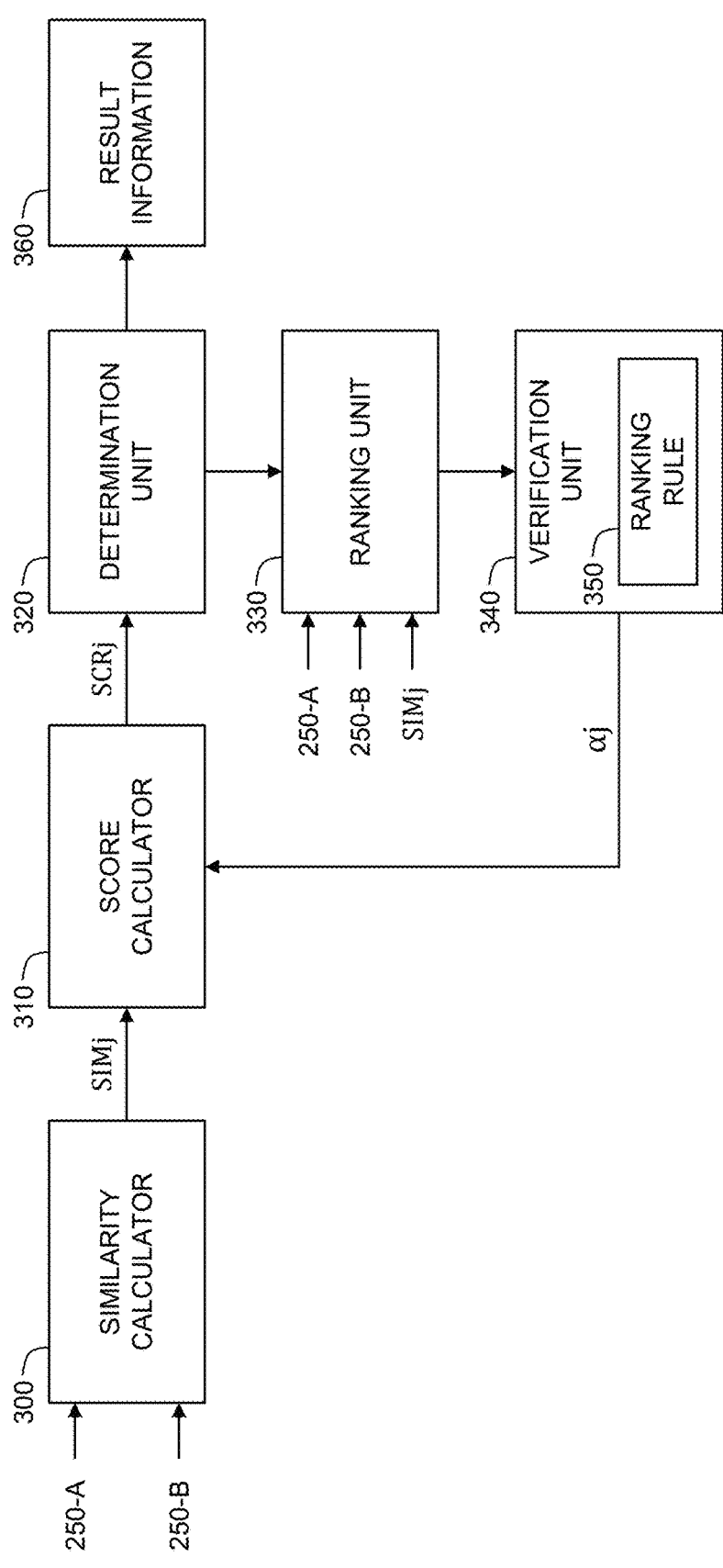
FIG. 3 is a block diagram showing an example of a functional configuration related to a re-identification process according to an embodiment.

FIG. 3 is a block diagram showing an example of a functional configuration related to the re-identification process performed by the ReID system 100 (the processor 110) according to the present embodiment. The ReID system 100 includes, as functional blocks, a similarity calculator 300, a score calculator 310, a determination unit 320, a ranking unit 330, and a verification unit 340.

The similarity calculator 300 acquires the first feature information 250-A related to the first person 1-A and the second feature information 250-B related to the second person 1-B from the memory 120. The similarity calculator 300 performs a "similarity calculation process" that calculates a similarity SIM between the first person 1-A and the second person 1-B based on the first feature information 250-A and the second feature information 250-B. More specifically, the similarity calculator 300 calculates the similarity SIM between the first person 1-A and the second person 1-B based on a combination of the ReID feature amount FEA-A[t] of the first person 1-A and the ReID feature amount FEA-B[t] of the second person 1-B. The similarity SIM becomes higher as a distance between the ReID feature amount FEA-A[t] and the ReID feature amount FEA-B[t] projected onto a feature amount space becomes smaller.

Figure 4:
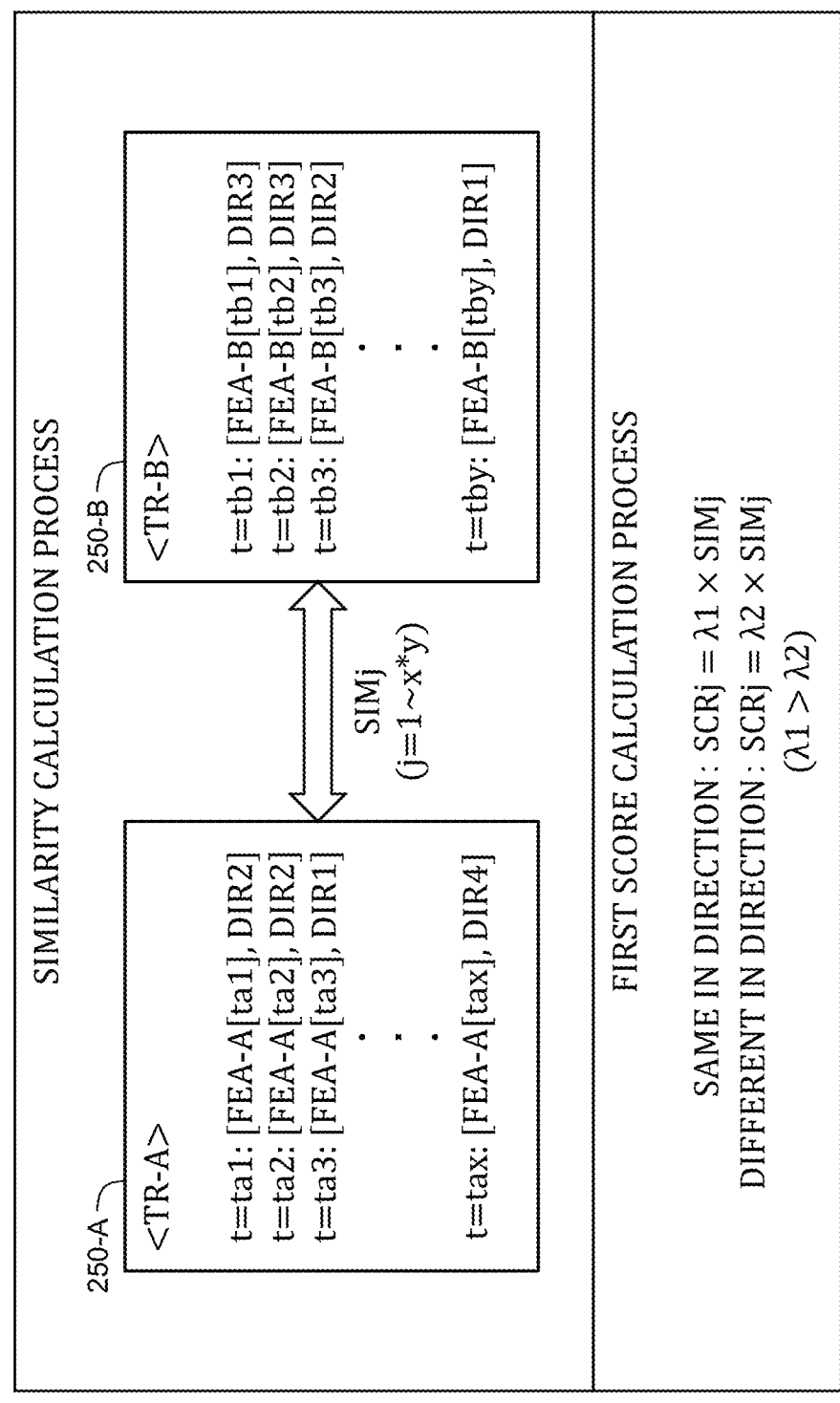
FIG. 4 is a diagram for explaining an example of a re-identification process according to an embodiment.

FIG. 4 shows an example of the similarity calculation process. The first feature information 250-A includes x combinations of the ReID feature amount FEA-A[t] and the direction DIR[t] of the first person 1-A related to the first track TR-A. The second feature information 250-B includes y combinations of the ReID feature amount FEA-B[t] and the direction DIR[t] of the second person 1-B related to the second track TR-B. The "x" and "y" are integers of 1 or more, and at least one of "x" and "y" is a plural number. The similarity calculator 300 calculates a plurality of similarities SIMj (j=1 to x×y) based on a plurality of combinations of the x ReID feature amounts FEA-A[t] and the y ReID feature amounts FEA-B[t].

Subsequently, the score calculator 310 performs a "first score calculation process (temporary score calculation process)" that calculates a score SCRj for each similarity SIMj. More specifically, the score calculator 310 calculates a plurality of scores SCRj (j=1 to x×y) based on the plurality of similarities SIMj (j=1 to x×y). The higher the similarity SIMj becomes, the higher the score SCRj corresponding to the similarity SIMj becomes.

FIG. 4 shows an example of the first score calculation process. In the example shown in FIG. 4, a weighted score SCRj is calculated in consideration of whether or not the direction DIR of the first person 1-A and the direction DIR of the second person 1-B are the same. More specifically, a first weight coefficient λ1 is a weight coefficient in a case where the direction DIR of the first person 1-A and the direction DIR of the second person 1-B are the same. On the other hand, a second weight coefficient λ2 is a weight coefficient in a case where the direction DIR of the first person 1-A and the direction DIR of the second person 1-B are different from each other. The second weight coefficient λ2 is smaller than the first weight coefficient λ1 (λ1>λ2). The similarity SIMj is calculated based on the combination of the ReID feature amount FEA-A[t] and the ReID feature amount FEA-B[t], and the direction DIR[t] of the first person 1-A at the time step of the ReID feature amount FEA-A[t] is obtained from the first feature information 250-A, and the direction DIR[t] of the second person 1-B at the time step of the ReID feature amount FEA-B[t] is obtained from the second feature information 250-B. For each of the plurality of similarities SIMj (j=1 to x×y), the score calculator 310 selects the first weight coefficient λ1 or the second weight coefficient λ2 as the weight coefficient based on the direction DIR[t] of the first person 1-A and the direction DIR[t] of the second person 1-B. Then, as shown in FIG. 4, the score calculator 310 calculates the weighted score SCRj by multiplying the similarity SIMj by the selected weight coefficient.

As a modification example, the score calculator 310 may set the similarity SIMj as it is as the score SCRj without performing the weighting. In either case, the higher the similarity SIMj becomes, the higher the score SCRj corresponding to the similarity SIMj becomes.

Subsequently, the determination unit 320 performs a "first determination process (temporary determination process)" that temporarily determines whether the first person 1-A and the second person 1-B are identical or not based on each of the plurality of scores SCRj (j=1 to x×y). More specifically, the determination unit 320 compares each score SCRj with the threshold TH. When the score SCRj is equal to or greater than a threshold value TH, the determination unit 320 temporarily determines that the first person 1-A and the second person 1-B are identical. On the other hand, when the score SCRj is less than the threshold value TH, the determination unit 320 temporarily determines that the first person 1-A and the second person 1-B are not identical. Since the first determination process is performed for each score SCRj, x×y pieces of determination results are obtained.

Subsequently, the ranking unit 330 performs a "ranking process" that ranks each of the plurality of similarities SIMj (j=1 to x×y).

Examples of definition of the rank and the ranking process will be described with reference to FIG. 5. There are four types Rank1 to Rank4 as the rank regarding the similarity between two persons (1-A, 1-B). The definitions of Rank1 to Rank4 are as follows.

Rank1: The two persons are identical, and the two persons are the same in the direction DIR.

Rank2: The two persons are identical, and the two persons are different in the direction DIR.

Rank3: The two persons are not identical, and the two persons are the same in the direction DIR.

Rank4: The two persons are not identical, and the two persons are different in the direction DIR.

An order of the ranks is Rank1>Rank2>Rank3>Rank4. That is, Rank1 is the highest rank and Rank4 is the lowest rank. Rank2 and Rank3 are intermediate ranks between Rank1 and Rank4.

The ranking unit 330 determines a plurality of ranks for the plurality of similarities SIMj (=1 to x×y). The similarity SIMj is calculated based on the combination of the ReID feature amount FEA-A[t] and the ReID feature amount FEA-B[t], and the direction DIR[t] of the first person 1-A at the time step of the ReID feature amount FEA-A[t] is obtained from the first feature information 250-A, and the direction DIR[t] of the second person 1-B at the time step of the ReID feature amount FEA-B[t] is obtained from the second feature information 250-B. Whether the first person 1-A and the second person 1-B are identical or not for each similarity SIMj is obtained from the result of the first determination process described above. Therefore, the ranking unit 330 is able to determine a plurality of ranks for the plurality of similarities SIMj (j=1 to x×y) based on the result of the first determination process, the first feature information 250-A, and the second feature information 250-B. As a result, as shown in FIG. 5, a correspondence relationship between the plurality of similarities SIMj and the plurality of ranks is obtained.

If the correspondence relationship is normal, the similarity SIMj to which Rank1 is given is higher than the similarity SIMj to which Rank2 is given, the similarity SIMj to which Rank2 is given is higher than the similarity SIMj to which Rank3 is given, and the similarity SIMj to which Rank3 is given is higher than the similarity SIMj to which Rank4 is given. That is, if the correspondence relationship is normal, the similarity SIMj should be higher as the rank is higher.

From the above viewpoint, the verification unit 340 performs a "verification process" that verifies whether the correspondence relationship between the plurality of similarities SIMj (=1 to x×y) and the plurality of ranks is valid or not. More specifically, the verification unit 340 holds a ranking rule 350 that "the rank is higher as the similarity SIMj is higher." The verification unit 340 compares the correspondence relationship between the plurality of similarities SIMj and the plurality of ranks with the ranking rule 350 to verify whether the correspondence relationship is valid or not.

Figure 5:
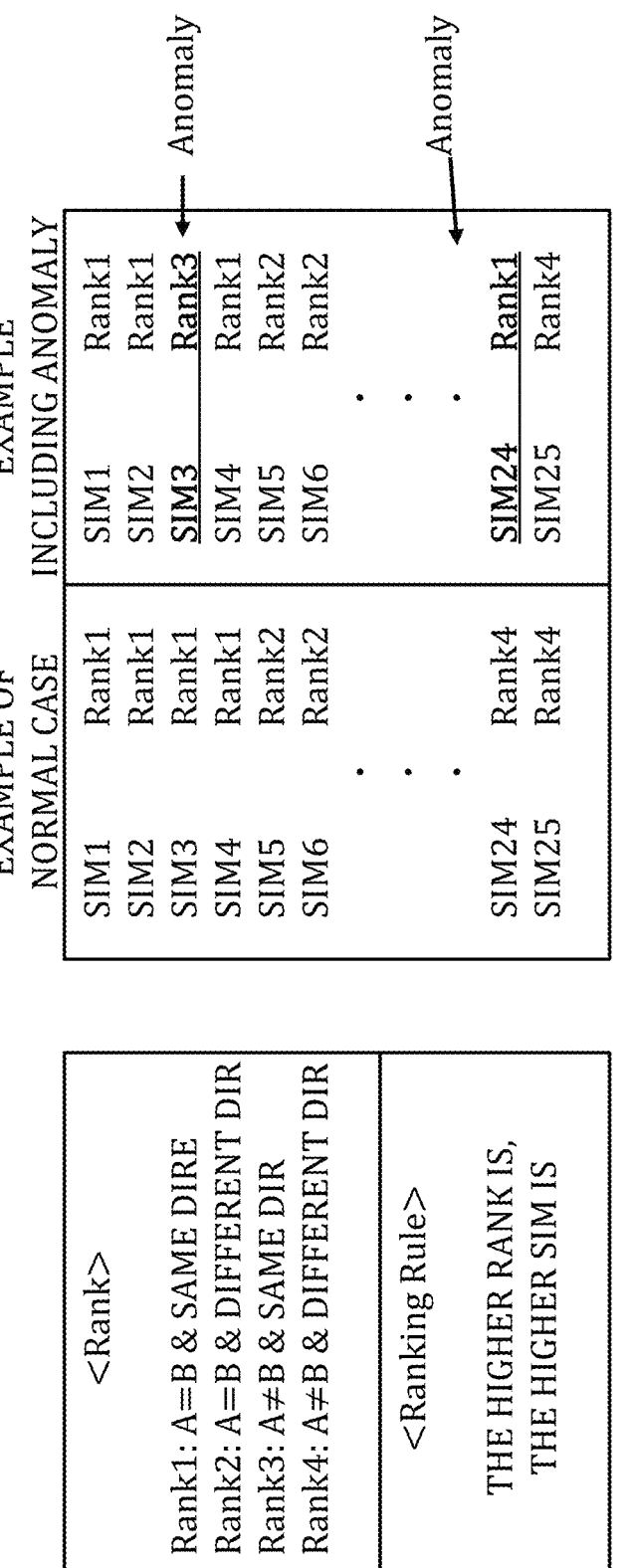
FIG. 5 is a diagram for explaining an example of a re-identification process according to an embodiment.

FIG. 5 shows both an example of a normal case and an example including anomaly. In this examples, the similarities SIM1, SIM2, . . . , SIM25 are higher in this order. In the example of the normal case, the correspondence relationship between the similarities SIM1 to SIM25 and the ranks is consistent with the ranking rule 350. On the other hand, in the example including the anomaly, the combination of the similarity SIM3 and Rank3 and the combination of the similarity SIM24 and Rank1 are not consistent with the ranking rule 350.

A degree of consistency αj indicates to which degree the correspondence relationship between the plurality of similarities SIMj (j=1 to x×y) and the plurality of ranks is consistent with the ranking rule 350. The verification unit 340 calculates the degree of consistency αj for each of the plurality of similarities SIMj based on the result of the verification process. For example, the degree of consistency αj is set to take a value of 0 to 1. In a case where a combination of the similarity SIMj and the rank is consistent with the ranking rule 350, the degree of consistency αj is set to be 1.0. On the other hand, in a case where a combination of the similarity SIMj and the rank is not consistent with the ranking rule 350, the degree of consistency αj is set to be less than 1.0. The degree of consistency αj may be set to be lower as the combination of the similarity SIMj and the rank deviates from the ranking rule 350. For example, if Rank1 is erroneously given although Rank2 should be given, the degree of deviation is "1." If Rank1 is erroneously given although Rank4 should be given, the degree of deviation is "3." As the degree of deviation increases, the degree of consistency αj becomes closer to 0.

As a modification example, a common degree of consistency αj may be calculated in common for all of the plurality of similarities SIMj (j=1 to x×y). For example, when two anomalies are present with respect to a total of 25 SIM1 to SIM25, the common degree of consistency αj is 23/25.

It can be said that the degree of consistency αj obtained by the verification process represents validity and reliability of the score SCRj calculated by the first score calculation process (temporary score calculation process). Therefore, according to the present embodiment, the score SCRj is modified in consideration of the degree of consistency αj. For this purpose, the degree of consistency αj obtained by the verification process is fed back to the score calculator 310.

Figure 6:
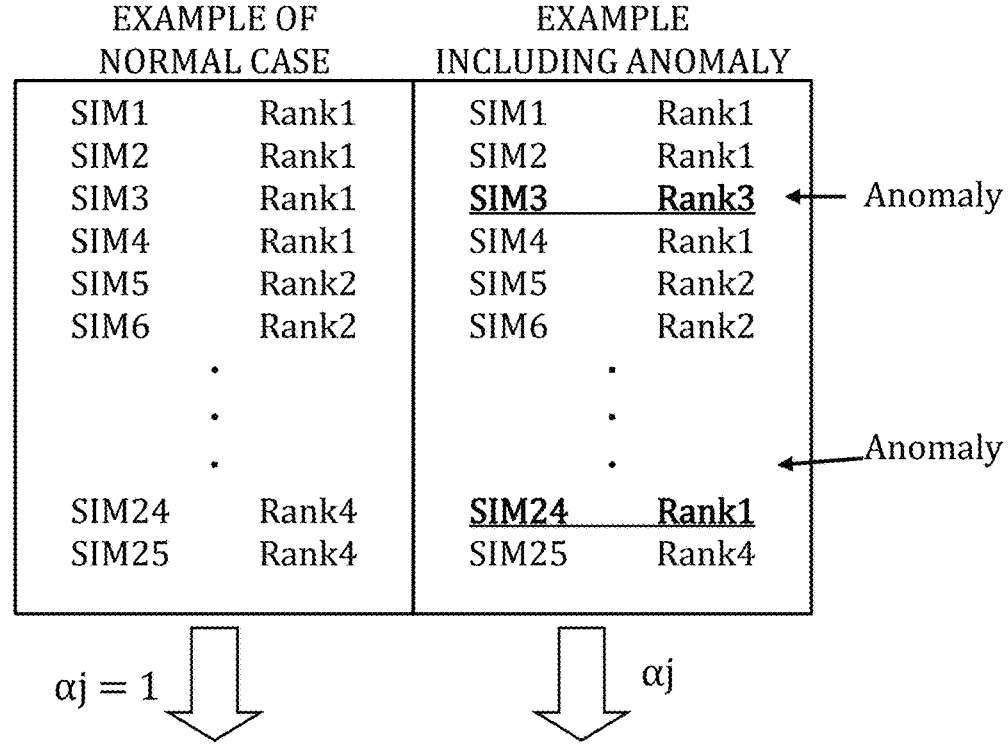
FIG. 6 is a diagram for explaining an example of a re-identification process according to an embodiment.

Upon receiving the degree of consistency αj, the score calculator 310 performs a "second score calculation process." In the second score calculation process, the score calculator 310 calculates a corrected score CSCRj by correcting the score SCRj based on the degree of consistency αj. FIG. 6 shows an example of the second score calculation process. The score calculator 310 corrects the original score SCRj by multiplying the original score SCRj for the similarity SIMj by the degree of consistency αj for the similarity SIMj to calculate the corrected score CSCRj.

The determination unit 320 receives a plurality of corrected scores CSCRj (j=1 to x×y). Then, the determination unit 320 performs a "second determination process" that determines whether the first person 1-A and the second person 1-B are identical or not based on the plurality of corrected scores CSCRj (j=1 to x×y). For example, the determination unit 320 calculates an average score of the plurality of corrected scores CSCRj (j=1 to x×y) and compares the average score with the threshold value TH. When the average score is equal to or greater than the threshold value TH, the determination unit 320 determines that the first person 1-A and the second person 1-B are identical. In this case, the identification information (track ID) of the first track TR-A and the second track TR-B is unified to the same information. On the other hand, when the average score is less than the threshold value TH, the determination unit 320 determines that the first person 1-A and the second person 1-B are not identical.

The determination unit 320 outputs result information 360 indicating a result of the second determination process. The result information 360 may be used for a variety of processes related to the re-identification process.

4. Effects

As described above, according to the present embodiment, the re-identification process is performed in consideration of the direction of the person 1. More specifically, the similarities SIMj in the re-identification process are ranked in consideration of the direction of the person 1. Further, the degree of consistency αj between the ranking result and the ranking rule is calculated. Then, the re-identification process is performed in consideration of the degree of consistency αj. In this manner, the re-identification process is performed in consideration of the direction of the person 1, and thus the accuracy of the re-identification process is improved.

The re-identification process according to the present embodiment can be applied to both online processing (Multi Track Multi Camera (MTMC)) and offline processing (person retrieval).

What is claimed is:

1. A re-identification system for re-identification of a moving object, the re-identification system comprising:
   processing circuitry; and
   one or more memories configured to store feature information indicating a combination of a re-identification feature amount and a direction of the moving object in a video, wherein
   types of a rank regarding a similarity between two moving objects include:
      a highest rank in a case where the two moving objects are identical and the two moving objects are same in the direction;
      a lowest rank in a case where the two moving objects are not identical and the two moving objects are different in the direction; and
      an intermediate rank between the highest rank and the lowest rank,
   a ranking rule is that the rank is higher as the similarity is higher, and
   the processing circuitry is configured to:
      calculate a plurality of similarities between a first moving object and a second moving object based on a plurality of combinations of the re-identification feature amount of the first moving object and the re-identification feature amount of the second moving object;
      perform a first determination process that temporarily determines whether the first moving object and the second moving object are identical or not based on each of the plurality of similarities;

determine a plurality of ranks for the plurality of similarities based on a result of the first determination process, the direction of the first moving object, and the direction of the second moving object;
compare a correspondence relationship between the plurality of similarities and the plurality of ranks with the ranking rule to calculate a degree of consistency between the correspondence relationship and the ranking rule; and
perform a second determination process that determines whether the first moving object and the second moving object are identical or not based on the degree of consistency and the plurality of similarities,
a first weight coefficient is a weight coefficient in a case where the direction of the first moving object and the direction of the second moving object are same,
a second weight coefficient is a weight coefficient in a case where the direction of the first moving object and the direction of the second moving object are different from each other, and the second weight coefficient is smaller than the first weight coefficient, and
the processing circuitry is further configured to:
   select, for each of the plurality of similarities, the first weight coefficient or the second weight coefficient as the weight coefficient based on the direction of the first moving object and the direction of the second moving object; and
   calculate a score by multiplying each similarity by the weight coefficient.

2. The re-identification system according to claim 1, wherein
   the processing circuitry is further configured to:
      calculate, for each of the plurality of similarities, the score that becomes higher as the similarity becomes higher;
      perform the first determination process that temporarily determines whether the first moving object and the second moving object are identical or not based on the score;
      calculate a corrected score by correcting the score based on the degree of consistency; and
      perform the second determination process that determines whether the first moving object and the second moving object are identical or not based on the corrected score.

3. The re-identification system according to claim 2, wherein
   the processing circuitry is further configured to:
      compare the correspondence relationship between the plurality of similarities and the plurality of ranks with the ranking rule to calculate the degree of consistency for each of the plurality of similarities; and
      correct the score by multiplying the score for the similarity by the degree of consistency for each similarity to calculate the corrected score.

4. The re-identification system according to claim 1, wherein
   the feature information indicates the combination of the re-identification feature amount and the direction of the moving object for a track, the track being information representing a time series of the moving object in the video.

* * * * *